(12) United States Patent
Park et al.

(10) Patent No.: US 11,796,476 B2
(45) Date of Patent: Oct. 24, 2023

(54) SINGLE OR DOUBLE FRAME NANOPARTICLE SYNTHESIS METHOD, AND SINGLE OR DOUBLE FRAME NANOPARTICLE PRODUCED THEREBY

(71) Applicant: Research & Business Foundation Sungkyunkwan University, Suwon-si (KR)

(72) Inventors: Sung Ho Park, Suwon-si (KR); Sung Jae Yoo, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 41 days.

(21) Appl. No.: 17/158,294

(22) Filed: Jan. 26, 2021

(65) Prior Publication Data

US 2021/0229173 A1    Jul. 29, 2021

(30) Foreign Application Priority Data

Jan. 28, 2020   (KR) .................. 10-2020-0009779

(51) Int. Cl.
| | |
|---|---|
| B22F 1/17 | (2022.01) |
| G01N 21/65 | (2006.01) |
| B22F 1/054 | (2022.01) |
| B22F 1/07 | (2022.01) |

(Continued)

(52) U.S. Cl.
CPC .......... *G01N 21/658* (2013.01); *B22F 1/054* (2022.01); *B22F 1/056* (2022.01); *B22F 1/0553* (2022.01); *B22F 1/07* (2022.01); *B22F 1/17* (2022.01); *B22F 2301/255* (2013.01); *B22F 2304/056* (2013.01); *B82Y 15/00* (2013.01); *B82Y 40/00* (2013.01)

(58) Field of Classification Search
CPC ........................................ B22F 1/17
See application file for complete search history.

(56) References Cited

FOREIGN PATENT DOCUMENTS

KR        10-1532881 B1    6/2015

OTHER PUBLICATIONS

Jang et al., Fabrication of 2D Au Nanorings with Pt Framework, Journal of the American Chemical Society, 2014, 136, p. 17674-17680 (Year: 2014).*

(Continued)

*Primary Examiner* — Tabatha L Penny
(74) *Attorney, Agent, or Firm* — NSIP Law

(57) ABSTRACT

A double frame nanoparticle synthesis method includes: forming a first platinum layer of a closed loop structure on an edge region of a 2-dimensional gold nanoparticle; removing a portion of the gold nanoparticle in an exposed inner region thereof free of the first platinum layer, thereby forming a single frame structure; growing a first gold thin film on the single frame structure; forming a second platinum layer on inner and outer edge regions of the first gold thin film; removing a portion of the first gold thin film in an exposed region thereof free of the second platinum layer, thereby forming a double frame structure having an inner frame of a closed loop structure, and an outer frame having a closed loop structure surrounding the inner frame and partially connected to the inner frame; and forming a second gold thin film on a surface of the double frame structure.

7 Claims, 5 Drawing Sheets

(51) Int. Cl.
 *B82Y 15/00* (2011.01)
 *B82Y 40/00* (2011.01)

(56) References Cited

OTHER PUBLICATIONS

Yoo, Two-dimensional nanoframes with dual rims, Nature Communications, 10.1, Dec. 19, 2019: 5789, p. 1-8 (Year: 2019).*

* cited by examiner

[FIG. 1]
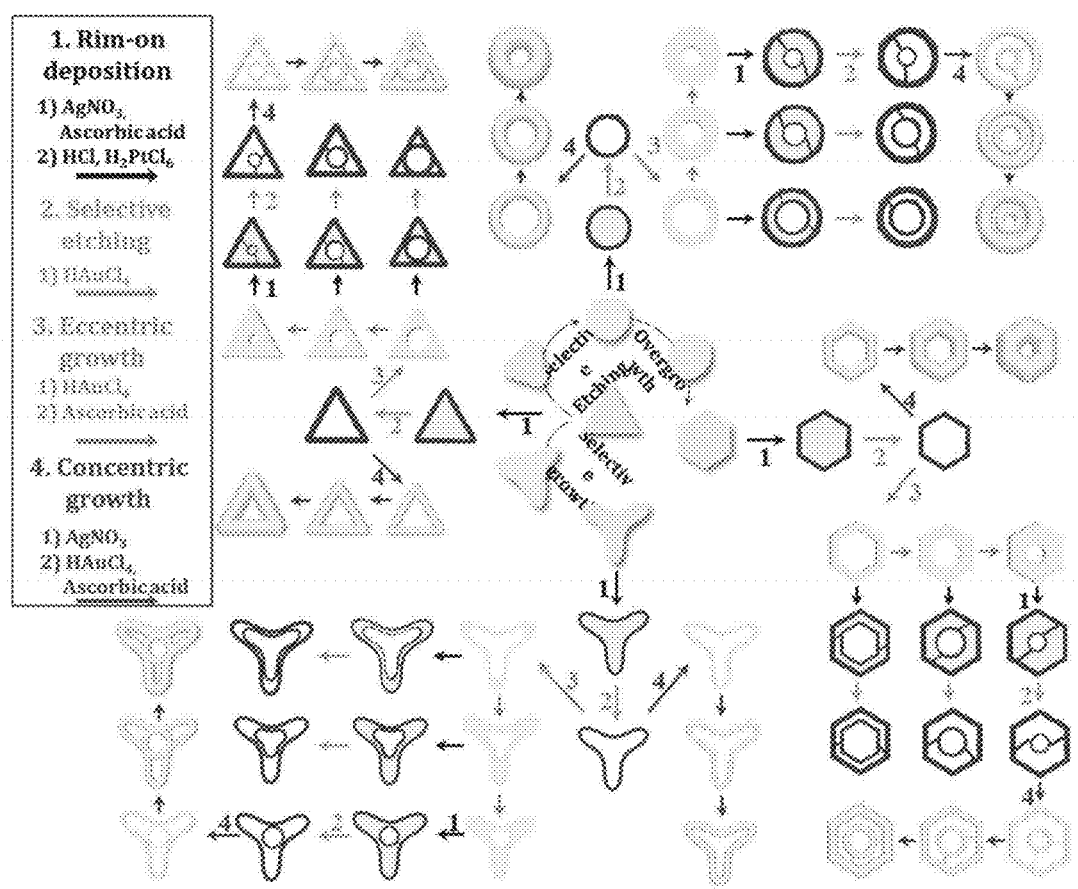

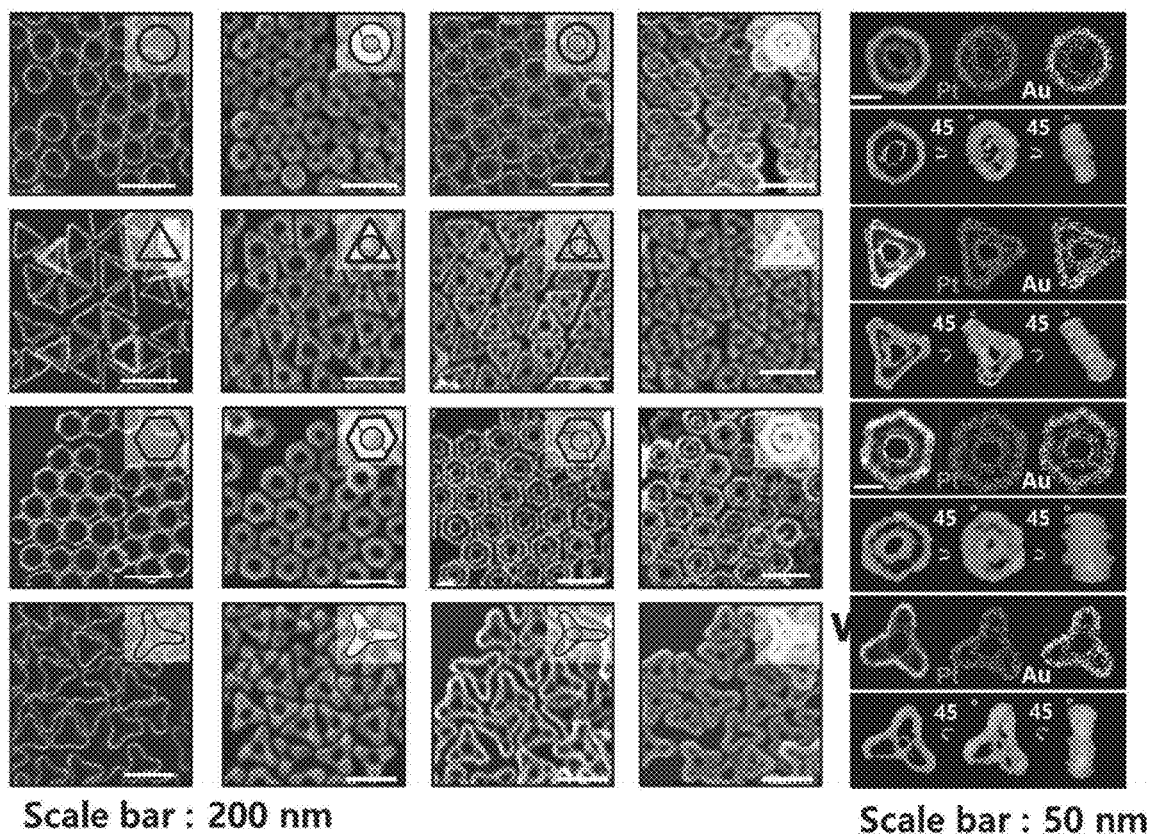
[FIG. 2]

[FIG. 3]
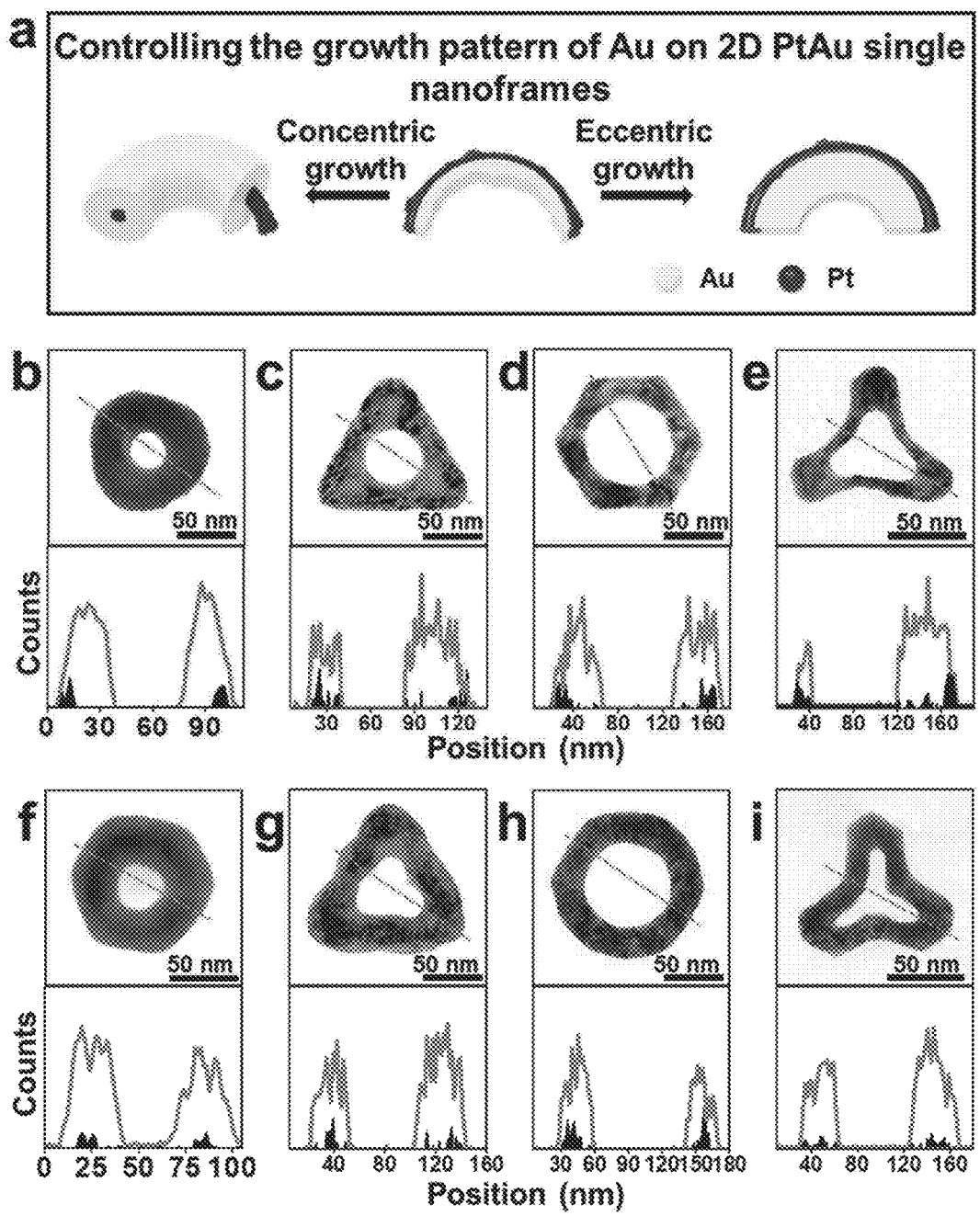

[FIG. 4]
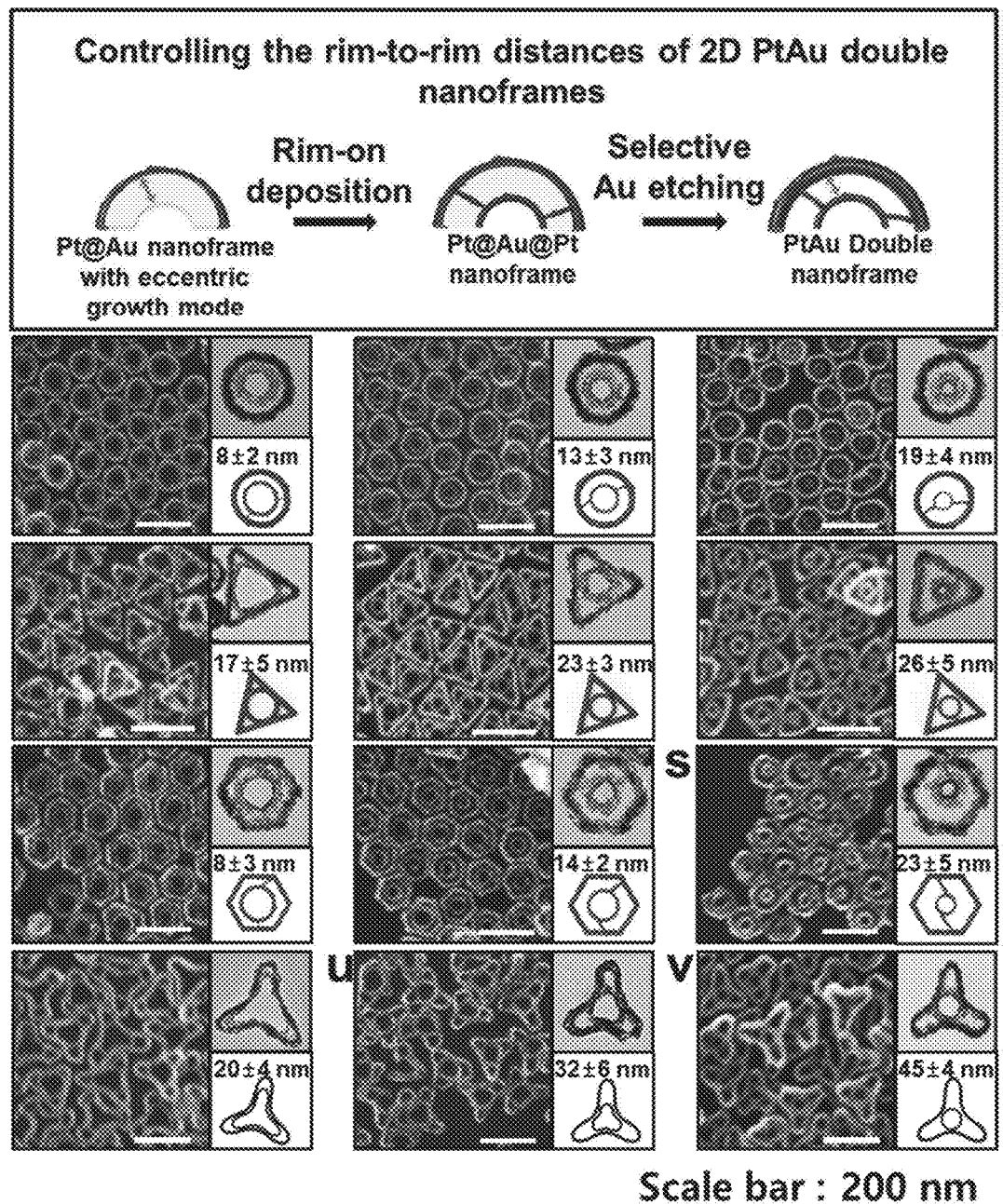

[FIG. 5]
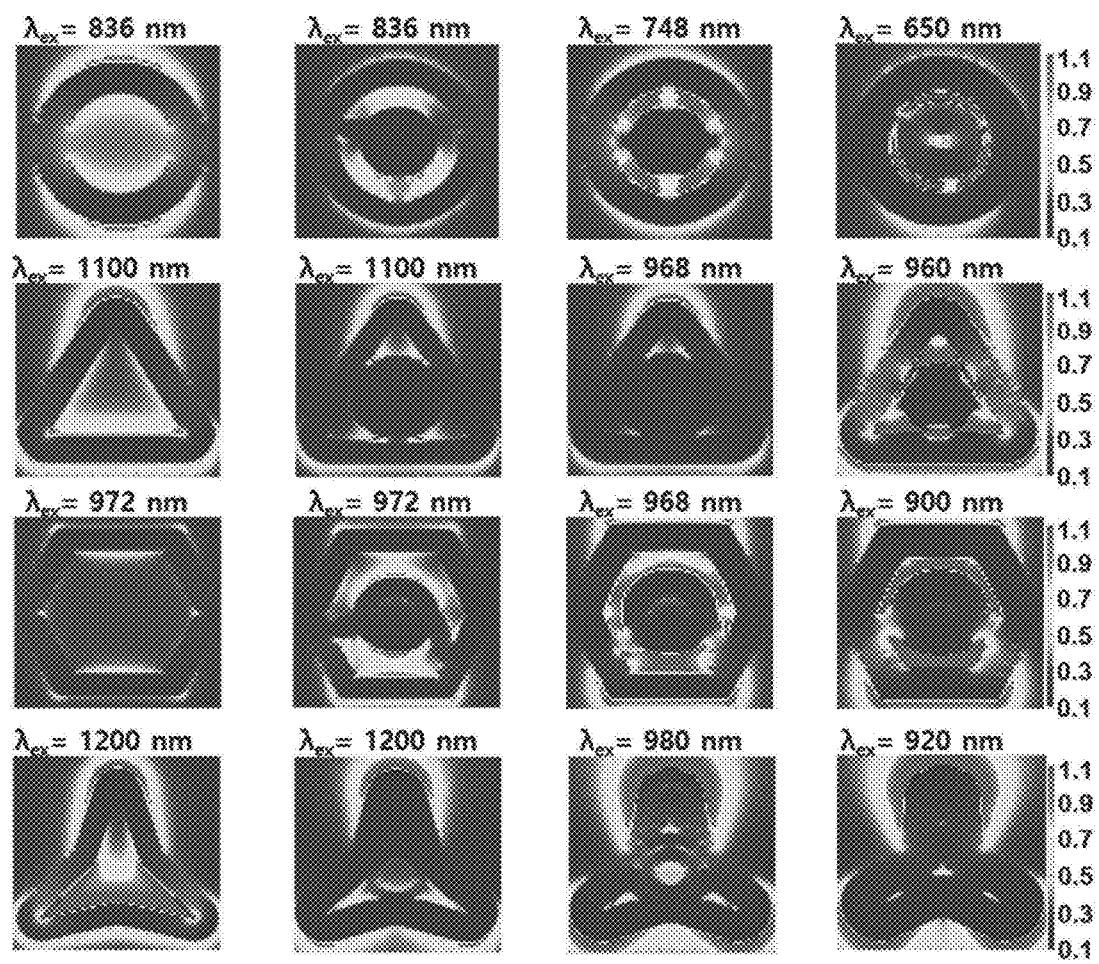

SINGLE OR DOUBLE FRAME NANOPARTICLE SYNTHESIS METHOD, AND SINGLE OR DOUBLE FRAME NANOPARTICLE PRODUCED THEREBY

CROSS-REFERENCE TO RELATED APPLICATION

This application claims a benefit under 35 U.S.C. § 119(a) of Korean Patent Application No. 10-2020-0009779 filed on Jan. 28, 2020, on the Korean Intellectual Property Office, the entire disclosure of which is incorporated herein by reference for all purposes.

BACKGROUND

1. Field

The present disclosure relates to a single or double frame nanoparticle synthesis method capable of uniformly synthesizing a nanoparticle having a single or complex frame structure, and precisely controlling a shape of a frame, and to a single or double frame nanoparticle produced thereby.

2. Description of Related Art

Recently, interest in synthesis of nanoparticle having a frame structure is increasing. Nanoparticles having a frame structure have characteristics that an exposed surface area thereof relative to a volume thereof is larger than that of solid nanoparticle. In particular, many studies on nanoparticle having a frame structure are being conducted in bio and catalyst applications.

In order to increase the characteristics of the frame structure, studies are being actively conducted to adjust a shape, a size and components of the frame. A typical frame synthesis method may include galvanic replacement reaction, selective growth, and etching methods.

However, in the nano-frame structure synthesized via the above methods, control of a shape, a size, and a component within a single frame structure has only been studied. There is still no research on a synthesis method that may precisely control a nanoparticle with a single or complex frame structure or realize high uniformity thereof.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One purpose of the present disclosure is to provide a double frame nanoparticle synthesis method capable of uniformly synthesizing a nanoparticle with a complex frame structure, and of precisely controlling a shape of a frame, and provide a double frame nanoparticle produced thereby.

Another purpose of the present disclosure is to provide a biosensor or a single molecule surface enhanced Raman scattering (SMSERS) substrate including the double frame nanoparticle.

Another purpose of the present disclosure is to provide a single frame nanoparticle synthesis method that may uniformly synthesize a single frame nanoparticle, and precisely control a shape of a frame, and provide a single frame nanoparticle produced thereby.

A first aspect of the present disclosure provides a double frame nanoparticle synthesis method comprising: forming a first platinum layer of a closed loop structure on an edge region of a 2-dimensional gold nanoparticle; removing a portion of the gold nanoparticle in an exposed inner region thereof free of the first platinum layer, thereby forming a single frame structure; growing a first gold thin film on the single frame structure; forming a second platinum layer on inner and outer edge regions of the first gold thin film; removing a portion of the first gold thin film in an exposed region thereof free of the second platinum layer, thereby forming a double frame structure, wherein the double frame structure has an inner frame of a closed loop structure, and an outer frame having a closed loop structure surrounding the inner frame, and partially connected to the inner frame; and forming a second gold thin film on a surface of the double frame structure.

In one implementation of the first aspect, forming the first platinum layer includes forming a first silver thin film on the 2-dimensional gold nanoparticle, and preforming galvanic replacement reaction of the first silver thin film with platinum ions, wherein forming the second platinum layer includes forming a second silver thin film on the first gold thin film, and preforming galvanic replacement reaction of the second silver thin film with platinum ions.

In one implementation of the first aspect, forming the single frame structure includes the removal of the gold nanoparticle using a solution providing gold trivalent ions, wherein forming the second frame structure includes the removal of the first gold thin film using a solution providing gold trivalent ions.

In one implementation of the first aspect, the solution providing the gold trivalent ions includes $HAuCl_4 \cdot nH_2O$ or $HAuCl_4$ solution.

In one implementation of the first aspect, growing the first gold thin film includes growing the first gold thin film in an eccentric growth mode in which the gold nanoparticle remains on an inner face of the single frame, and thus the first gold thin film grows faster on the inner face of the single frame structure than on an outer face of the single frame structure.

In one implementation of the first aspect, forming the second platinum layer is performed until portions of the second platinum layer respectively formed on the inner and outer edge regions of the first gold thin film are connected to each other.

In one implementation of the first aspect, forming the second gold thin film includes forming a silver thin film on the double frame structure, and growing the second gold thin film on a surface of the double frame structure.

A second aspect of the present disclosure provides a double frame nanoparticle comprising: an inner frame of a closed loop structure; an outer frame having a closed loop structure surrounding the inner frame, and partially connected to the inner frame; and a gold nanoparticle covering surfaces of the inner and outer frames.

In one implementation of the second aspect, a spacing between the inner frame and the outer frame is in a range of 8 to 50 nm.

In one implementation of the second aspect, an intensity and a distribution of an electromagnetic field in the double frame nanoparticle is controlled based on the spacing between the inner and outer frames.

A third aspect of the present disclosure provides a biosensor comprising the double frame nanoparticle.

In one implementation of the third aspect, a size of the double frame nanoparticle is in a range of 100 to 200 nm.

A fourth aspect of the present disclosure provides a single molecule surface enhanced Raman scattering (SMSERS) substrate comprising the double frame nanoparticle.

In one implementation of the fourth aspect, a size of the double frame nanoparticle is in a range of 100 to 300 nm.

A fifth aspect of the present disclosure provides a single frame nanoparticle synthesis method comprising: forming a platinum layer of a closed loop structure on an edge region of a 2-dimensional gold nanoparticle; removing a portion of the gold nanoparticle in an exposed inner region thereof free of the first platinum layer, thereby forming a single frame structure; forming a silver thin film on the single frame structure; and forming a gold thin film on a surface of the single frame structure.

A sixth aspect of the present disclosure provides a single frame nanoparticle comprising: a 2-dimensional single frame containing platinum; and a gold nanoparticle covering a surface of the single frame.

A seventh aspect of the present disclosure provides a biosensor comprising the single frame nanoparticle.

In one implementation of the seventh aspect, a size of the single frame nanoparticle is in a range of 100 to 300 nm.

Effects of the present disclosure may be as follows but may not be limited thereto.

According to the present disclosure, a growth mode of gold may be selected between the eccentric growth and the concentric growth, thereby uniformly synthesizing a nanoparticle having the double frame structure as well as the single frame structure having a high surface area.

Further, the double frame nanoparticle according to the present disclosure exhibits a localized surface plasmon resonance (LSPR) phenomenon due to the interaction between light and metal because the gold component as a plasmonic metal covers the surfaces of the inner and outer frames. Further, the double frame nanoparticle according to the present disclosure have the larger surface area, thereby generating a high electromagnetic field within the particle.

In particular, the method for preparing the double frame nanoparticle according to the present disclosure may control the amount of the eccentric growth of gold during the production, thereby precisely controlling the spacing between the inner and outer frames. Based on the spacing, the intensity and distribution of the electromagnetic field of the double frame nanoparticle may be controlled.

Therefore, the double frame nanoparticle according to the present disclosure may be used for the biosensor. In particular, since the double frame nanoparticle according to the present disclosure has a high electromagnetic field in a single particle, the double frame nanoparticle according to the present disclosure may be effectively used for the single molecule surface enhanced Raman scattering (SMSERS) substrate.

In addition to the effects as described above, specific effects of the present disclosure will be described together with the detailed description for carrying out the disclosure.

BRIEF DESCRIPTION OF DRAWINGS

FIG. 1 is a schematic diagram of a single or double frame nanoparticle synthesis method according to an embodiment of the present disclosure.

FIG. 2 shows SEM/TEM images and tomography images at each of steps of a production process of double frame nanoparticles with various shapes.

FIG. 3 shows TEM images of single frame nanoparticles having various shapes and corresponding line mapping profiles.

FIG. 4 shows SEM/TEM images of double frame nanoparticles with variously controlled spacings between outer and inner frames.

FIG. 5 shows results of FDTD simulation of double frame nanoparticles with various shapes.

DETAILED DESCRIPTIONS

For simplicity and clarity of illustration, elements in the figures are not necessarily drawn to scale. The same reference numbers in different figures denote the same or similar elements, and as such perform similar functionality. Moreover, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the terms "gold thin film" and "silver thin film" mean a "gold film" and a "silver film" each having an arbitrary thickness and formed on a single and/or double frame structure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic diagram of a single or double frame nanoparticle synthesis method according to an embodiment of the present disclosure.

Referring to FIG. 1, a double frame nanoparticle synthesis method according to an embodiment of the present disclosure includes: 1) forming a first platinum layer of a closed loop structure on an edge region of a 2-dimensional gold nanoparticle; 2) removing a portion of the gold nanoparticle in an exposed inner region thereof free of the first platinum layer, thereby forming a single frame structure; 3) growing a first gold thin film on the single frame structure; 4) forming a second platinum layer on inner and outer edge regions of the first gold thin film; 5) removing a portion of the first gold thin film in an exposed region thereof free of the second platinum layer, thereby forming a double frame structure, wherein the double frame structure has an inner frame of a closed loop structure, and an outer frame having a closed loop structure surrounding the inner frame, and partially connected to the inner frame; and 6) forming a second gold thin film on a surface of the double frame structure.

In step 1), the first platinum layer of the closed loop structure is formed on the edge region of the 2-dimensional gold nanoparticle. In this connection, the 2-dimensional gold nanoparticle may have various 2-dimensional shapes such as disks, prisms, triangles, and hexagons, as shown in FIG. 1.

Specifically, the first platinum layer of step 1) may be formed by forming a silver thin film on the 2-dimensional gold nanoparticle, and then subjecting the silver thin film to a galvanic replacement reaction with platinum ions.

In an embodiment, a reducing agent and a silver precursor (e.g., silver nitrate) are added to a reaction solution containing the 2-dimensional gold nanoparticle to form a silver thin film. A platinum salt (e.g., H2PtCl4) is additionally added thereto to perform the galvanic replacement reaction under acidic condition, thereby forming the closed loop structure-based first platinum layer on the edge region of the 2-dimensional gold nanoparticle.

In this connection, a reason why the platinum selectively grows on the edge region of the gold nanoparticle is that the edge region of the gold nanoparticle has higher surface energy than that of a terrace region thereof. Due to this difference in the surface energy, the galvanic replacement reaction between the silver thin film and the platinum ions selectively occurs on the edge region to form the first platinum layer.

Next, in step 2), a portion of gold nanoparticle in the exposed region of the gold nanoparticle free of the first platinum layer is removed to form the single frame structure.

Specifically, the gold nanoparticle may be etched away using a solution that provides gold trivalent ions, such that a portion of the gold nanoparticle in the exposed region thereof free of the first platinum layer may be removed. Thus, the single frame structure in which the inner region is empty may be formed.

In this connection, the gold trivalent ion-providing solution is preferably a $HAuCl_4 \cdot nH_2O$ or $HAuCl_4$ solution, but is not limited thereto.

Next, in step 3), the first gold thin film is grown on the single frame structure.

In an embodiment, a reducing agent and a gold precursor (e.g., $HAuCl_4$) is added to a reaction solution containing the single frame structure, such that the first gold thin film may be grown on the single frame structure.

In this connection, because the gold nanoparticle partially remains on an inner face of the single frame, the first gold thin film tends to selectively grow on a surface of the gold nanoparticle with a relatively smaller difference in a lattice mismatch constant from that of the first gold thin film rather than on a surface of the first platinum layer with a relative larger difference in a lattice mismatch constant from that of the first gold thin film. Therefore, the first gold thin film grows on the single frame structure in an eccentric growth mode in which the first gold thin film grows faster in an inner region of the single frame structure where a portion of the gold nanoparticle remains than in an outer region of the single frame structure. The amount of the eccentric growth may be controlled such that an inner gap size in the double frame structure formed in step 5) which will be described later may be precisely adjusted.

Thereafter, in step 4), the second platinum layer may be formed on the inner and outer edge regions of the first gold thin film.

Specifically, the second platinum layer of step 4) may be formed by forming a silver thin film on the first gold thin film, and then performing a galvanic replacement reaction of the silver thin film with platinum ions. The reaction may be carried out in the same manner as in step 1).

In this connection, a reason why the platinum selectively grows in the inner and outer edge regions of the first gold thin film is that the edge region of the first gold thin film has the surface energy higher than that of a terrace region as described in step 1). Due to this difference in the surface energy, the galvanic replacement reaction between the silver thin film and the platinum ions selectively occurs on the edge region to form the second platinum layer.

Further, the step of forming the second platinum layer (step 4)) is preferably performed until portions of the second platinum layer respectively formed on the inner and outer edge regions of the first gold thin film are connected to each other. This is intended to form the double frame structure in step 5) to be described later.

In step 5), a portion of the first gold thin film in the exposed region thereof free of the second platinum layer may be removed, such that the double frame structure having the inner frame of a closed loop structure and an outer frame having a closed loop structure surrounding the inner frame, and partially connected to the inner frame may be formed.

That is, in step 4), the portions of the second platinum layer formed respectively on the inner and outer edge regions of the first gold thin film are connected to each other. Thus, even after the portion of the first gold thin film in the exposed region thereof free of the second platinum layer has been removed, the double frame structure including the inner frame and the outer frame partially connected to the inner frame may be formed.

Specifically, the first gold thin film may be partially etched away using a solution that provides gold trivalent ions, such that a portion of the first gold thin film in the exposed region thereof free of the second platinum layer may be removed, thereby forming the double frame structure having the inner frame of a closed loop structure and an outer frame having a closed loop structure surrounding the inner frame, and partially connected to the inner frame.

In this connection, the gold trivalent ion-providing solution is preferably a $HAuCl_4 \cdot nH_2O$ or $HAuCl_4$ solution, but is not limited thereto.

The double frame structure has an inner gap between the inner and outer frames. This inner gap size may be precisely controlled by adjusting an amount of the eccentric growth of the first gold thin film.

Thereafter, in step 6), the second gold thin film is formed on the surface of the double frame structure.

In this connection, because a portion of the first gold thin film remains on an inner face of the double frame, growth rates of the second gold thin film on the inner face and an outer face thereof may differ from each other due to a difference between the lattice mismatch constants of the first gold thin film and the second platinum layer.

Thus, in order to prevent this selective growth, and to grow the second gold thin film evenly on the surface of the double frame structure, step 6) may be carried out as follows. A silver thin film may be formed on the double frame structure, and a reducing agent and a gold precursor (e.g., $HAuCl_4$) may be added to the reaction solution, and thus the second gold thin film may be formed on the surface of the double frame structure in the concentric growth mode.

Thus, when the silver thin film is formed on the double frame structure, the difference in the lattice mismatch constant may be reduced, so that the second gold thin film may grow evenly on the surface of the double frame structure.

Further, a single frame nanoparticle synthesis method according to another embodiment of the present disclosure includes: 1) forming a platinum layer of a closed loop structure on an edge region of a 2-dimensional gold nanoparticle; 2) removing a portion of the gold nanoparticle in an exposed inner region thereof free of the first platinum layer, thereby forming a single frame structure; 3) forming a silver thin film on the single frame structure; and 4) forming a gold thin film on a surface of the single frame structure.

In this connection, steps 1) and 2) are performed in the same way as those of the double frame nanoparticle synthesis method. Thus, descriptions thereof are omitted.

In step 3), a silver thin film is formed on the single frame structure.

Specifically, a silver nitrate solution may be used to form the silver thin film. This is intended to reduce the difference between the lattice mismatch constants of a portion of the gold nanoparticle remaining on an inner face of the single frame and the first platinum layer, such that in step 4) which will be described later, the gold thin film grows evenly over the entire surface of the single frame structure.

Then, in step 4), the gold thin film is formed on the surface of the single frame structure.

Specifically, a reducing agent and a gold precursor (e.g., $HAuCl_4$) are added to the reaction solution containing the single frame structure, such that the gold thin film may be evenly grown on the surface of the single frame structure in a concentric growth mode.

According to the present disclosure, controlling the growth mode of the gold between the eccentric growth and the concentric growth may allow the nanoparticle having the double frame structure as well as a single frame structure having a high surface area may be uniformly synthesized.

In particular, controlling the amount of the eccentric growth of the first gold thin film may allow the spacing between the outer and inner frames of the double frame nanoparticle to be precisely controlled, such that the intensity and distribution of the electromagnetic field of the double frame nanoparticle may be controlled.

Further, the present disclosure may provide the double frame nanoparticle produced according to the production method.

The double frame nanoparticle according to an embodiment of the present disclosure includes an inner frame of a closed loop structure; an outer frame having a closed loop structure surrounding the inner frame, and partially connected to the inner frame; and a gold nanoparticle covering surfaces of the inner and outer frames.

Each of the inner frame and the outer frame includes platinum. The outer frame may have various 2-dimensional shapes such as disk, prism, tripod, hexagonal, etc. The inner frame may have a disk shape, but is not limited thereto. In this connection, a spacing between the inner frame and the outer frame may be in a range of 8 to 50 nm.

The double frame nanoparticle according to the present disclosure exhibits a localized surface plasmon resonance (LSPR) phenomenon due to the interaction between light and metal because the gold component as a plasmonic metal covers the surfaces of the inner and outer frames. Due to the high surface area, the high electromagnetic field may be generated within the particle.

In particular, in the double frame nanoparticle according to the present disclosure, the spacing between the inner and outer frames may be precisely controlled by adjusting the amount of the eccentric growth of the first gold thin film during production. Based on the spacing control, the intensity and distribution of the electromagnetic field in the double frame nanoparticle may be controlled.

Therefore, the double frame nanoparticle according to the present disclosure may be used for a biosensor. In particular, since the double frame nanoparticle has a high electromagnetic field in a single particle, the double frame nanoparticle may be effectively used for a single molecule surface enhanced Raman scattering (SMSERS) substrate. In this connection, the size of the double frame nanoparticle used for the biosensor or the SMSERS substrate may be preferably in a range of 100 to 300 nm.

Moreover, the present disclosure may provide the single frame nanoparticle produced according to the production method.

The single frame nanoparticle according to an embodiment of the present disclosure includes a 2-dimensional single frame including platinum; and a gold nanoparticle covering a surface of the single frame;

The single frame nanoparticle may have various 2-dimensional shapes such as a disk, a prism, a tripod, and a hexagon, but is not limited thereto.

Further, the single frame nanoparticle exhibits a localized surface plasmon resonance (LSPR) phenomenon due to the interaction between light and metal because the gold component as a plasmonic metal covers the surface of the single frame. Due to the high surface area, the single frame nanoparticle may generate high electromagnetic field within the particle.

Therefore, the single frame nanoparticle may be efficiently used for a biosensor, thereby enabling reliable sensing. In this connection, a size of the single frame nanoparticle may be preferably in a range of 100 to 300 nm.

Hereinafter, Examples of the present disclosure will be described in detail.

However, the following Examples are only some embodiments of the present disclosure, and the scope of the present disclosure is not limited to the following Examples.

Example 1

In an experiment, all processes were executed via reaction in aqueous solution, and a degree of reaction was determined using ultraviolet-visible light spectroscopy.

First, a disk, prism, hexagonal, and triangular gold nanoparticle was prepared. Thereafter, under presence of iodide ions (50 mM), 5 mL of dispersed gold nanoparticles, 20 mL of 50 mM cetyltrimethylammonium bromide (CTAB), 340 mL of 0.1 M sodium hydroxide, and 2 mM silver nitrate solution were added to a vial. Then, 426 mL of 10 mM ascorbic acid was added thereto, and then the mixture solution was maintained at 70° C. for 1 hour to form a silver thin film.

Thereafter, 540 mL of a 2 mM $H_2PtCl_6$ aqueous solution was added to the mixture solution. The mixture was subjected to galvanic replacement reaction at 70° C. for about 3 hours to form the first platinum layer of a closed loop structure on the edge region of the gold nanoparticle.

Afterwards, 100 µl of 2 mM $HAuCl_4$ aqueous solution as an etching and gold precursor was added to 2 ml of 0.05M cetyltrimethylammonium bromide (CTAB) aqueous solution as a metal nanoparticle stabilizer to prepare a solution. Then, 300 µl of gold nanoparticles having the first platinum layer formed thereon as dispersed in 5 ml of distilled water were added to the prepared solution. Thus, etching was performed for 30 minutes at a temperature of 50° C.

After the etching was completed, when a temperature of the reaction solution dropped to room temperature, 100 µl of 2 mM $HAuCl_4$ aqueous solution and 250 µl of 5.3 mM ascorbic acid were added thereto to grow the first gold thin film.

Thereafter, the second platinum layer was formed on the inner and outer edge regions of the first gold thin film in the same manner as the formation of the first platinum layer. Further etching was performed again in the same manner as the above etching manner to form the double frame structure.

Thereafter, a silver nitrate solution was added to the solution containing the double frame structure to form a silver thin film. Then, 100 µl of 2 mM $HAuCl_4$ aqueous solution and 250 µl of 5.3 mM ascorbic acid were added thereto such that the second gold thin film was grown, thereby to produce the double frame nanoparticle.

Example 2

In the same manner as in the Example 1, a platinum layer with a closed loop structure was formed on the edge region of the gold nanoparticle.

Subsequently, 100 µl of 2 mM $HAuCl_4$ aqueous solution as an etching and gold precursor was added to 2 ml of 0.05M cetyltrimethylammonium bromide (CTAB) aqueous solution as a metal nanoparticle stabilizer to prepare a solution.

Then, 300 µl of gold nanoparticles having the first platinum layer formed thereon as dispersed in 5 ml of distilled water were added to the prepared solution. Thus, etching was performed for 30 minutes at a temperature of 50° C.

After the etching was completed, when a temperature of the reaction solution dropped to room temperature, a silver nitrate solution is added to the solution containing the gold nanoparticle to form a silver thin film. Then, 100 µl of 2 mM $HAuCl_4$ aqueous solution and 250 µl of 5.3 mM ascorbic acid were added thereto such that the gold thin film was grown, thereby producing the single frame nanoparticle.

Experimental Example

FIG. 2 shows SEM/TEM images and tomography images at each of steps of a production process of double frame nanoparticles with various shapes. FIG. 3 shows TEM images of single frame nanoparticles having various shapes and corresponding line mapping profiles. FIG. 4 shows SEM/TEM images of double frame nanoparticles with variously controlled spacings between outer and inner frames.

Referring to FIGS. 2 to 4, it was found that the finally synthesized single or double frame nanoparticle maintains a high particle uniformity of a starting material. Further, it was found that each of the synthesized single frame nanoparticle and double frame nanoparticle has a size of about 100 to 200 nm.

Further, as shown in FIG. 4, it was identified that controlling the amount of the eccentric growth of the first gold thin film may allow the spacing between the outer and inner frames of the double frame nanoparticle to be precisely controlled. Specifically, the spacing between the outer frame and the inner frame was measured to be 8 to 50 nm.

FIG. 5 shows the results of FDTD simulation of double frame nanoparticles with various shapes Referring to FIG. 5, it was found that in the double frame nanoparticle in each of a form of a disk and a hexagonal form, as the gap size between the outer and inner frames is smaller, the electromagnetic field enhancement increases in the inner gap.

Further, it was identified that in the prism-shaped or triangular double frame nanoparticle, the enhancement of the electromagnetic field outside a vertex increases.

Thus, the double frame nanoparticle according to the present disclosure has a high electromagnetic field within a single particle, and thus may be effectively used for a single molecule surface enhanced Raman scattering (SMSERS) substrate.

It will be understood that although the above disclosure has been described with reference to the preferred embodiments of the present disclosure, those skilled in the art may achieve modifications and changes thereto within a range that does not deviate from the spirit and scope of the present disclosure as described in the following claims.

What is claimed is:

1. A double frame nanoparticle synthesis method comprising:
    forming a first platinum layer of a closed loop structure on an edge region of a 2-dimensional gold nanoparticle;
    removing a portion of the gold nanoparticle in an exposed inner region thereof free of the first platinum layer, thereby forming a single frame structure;
    growing a first gold thin film on the single frame structure;
    forming a second platinum layer on inner and outer edge regions of the first gold thin film;
    removing a portion of the first gold thin film in an exposed region thereof free of the second platinum layer, thereby forming a double frame structure, wherein the double frame structure has an inner frame of a closed loop structure, and an outer frame having a closed loop structure surrounding the inner frame, and partially connected to the inner frame; and forming a second gold thin film on a surface of the double frame structure.

2. The method of claim 1, wherein forming the first platinum layer includes forming a first silver thin film on the 2-dimensional gold nanoparticle, and preforming galvanic replacement reaction of the first silver thin film with platinum ions, and wherein forming the second platinum layer includes forming a second silver thin film on the first gold thin film, and preforming galvanic replacement reaction of the second silver thin film with platinum ions.

3. The method of claim 1, wherein forming the single frame structure includes the removal of the gold nanoparticle using a solution providing gold trivalent ions, and wherein forming the double frame structure includes the removal of the first gold thin film using the solution providing gold trivalent ions.

4. The method of claim 3, wherein the solution providing the gold trivalent ions includes $HAuCl_4 \cdot nH_2O$ or $HAuCl_4$ solution.

5. The method of claim 1, wherein growing the first gold thin film includes growing the first gold thin film in an eccentric growth mode in which the gold nanoparticle remains on an inner face of the single frame, and thus the first gold thin film grows faster on the inner face of the single frame structure than on an outer face of the single frame structure.

6. The method of claim 1, wherein forming the second platinum layer is performed until portions of the second platinum layer respectively formed on the inner and outer edge regions of the first gold thin film are connected to each other.

7. The method of claim 1, wherein forming the second gold thin film includes forming a silver thin film on the double frame structure, and growing the second gold thin film on a surface of the double frame structure.

* * * * *